F. A. MERRILL & J. S. C. NICHOLLS.
VALVE.
APPLICATION FILED MAY 25, 1910.
979,532.
Patented Dec. 27, 1910.
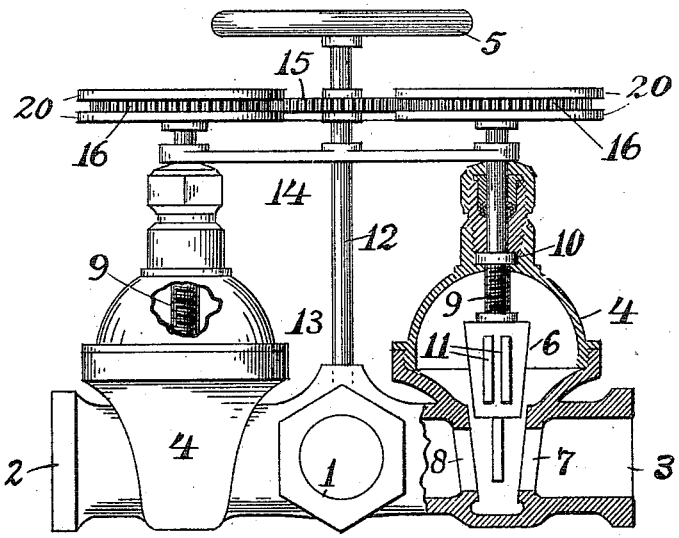
Fig.1
Fig.2
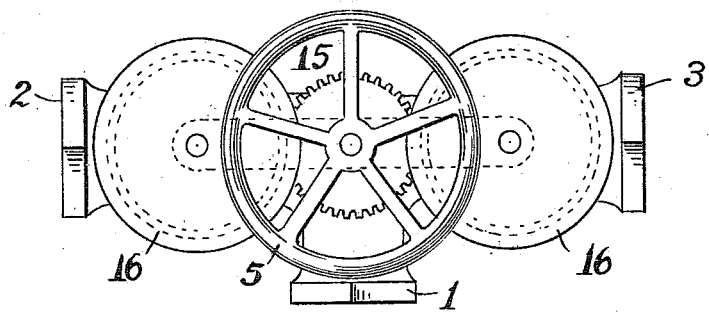
Fig.3
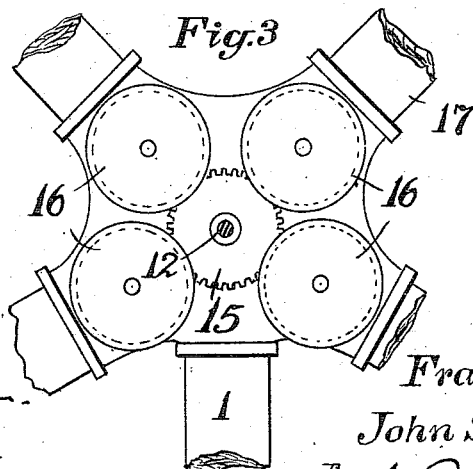
Witnesses
M. W. Upham
M. L. Waite
Inventors,
Frank A. Merrill,
John S. C. Nicholls;
By A. B. Upham,
Attorney.

UNITED STATES PATENT OFFICE.

FRANK A. MERRILL, OF MALDEN, AND JOHN S. C. NICHOLLS, OF BOSTON, MASSACHUSETTS, ASSIGNORS OF ONE-THIRD TO WILLIAM G. MERRILL, OF MALDEN, MASSACHUSETTS.

VALVE.

979,532.

Specification of Letters Patent. Patented Dec. 27, 1910.

Application filed May 25, 1910. Serial No. 563,307.

*To all whom it may concern:*

Be it known that we, FRANK A. MERRILL, of Malden, in the county of Middlesex and Commonwealth of Massachusetts, and JOHN S. C. NICHOLLS, of Boston, in the county of Suffolk and said Commonwealth, both citizens of the United States, have invented certain new and useful Improvements in Valves, of which the following is a specification.

In all three-way valves of which we have any knowledge, there is always a liability of their binding and refusing to open or close whenever used in connection with hot fluids. The object of this invention is the construction of a multi-way valve which shall be free from any such contingency, and which shall, in addition, be capable of tight closure and immunity from leakage no matter what the conditions of temperature may be.

Referring to the drawings forming part of this specification, Figure 1 is an elevation, partly sectional, of a three-way valve made in accordance with our invention. Fig. 2 is a plan view of the same. Fig. 3 is a plan view of a multi-way valve made in accordance with our invention.

The numeral 1 designates a supply pipe from which extend branches 2 and 3; the purpose of the valve being to enable either one or the other of said branches to be opened or closed; the closure of one acting to open the other, and vice versa. The complete three-way valve comprises a single body having two valve-members 4 so coupled together to a single operating wheel 5 as to enable said members to be simultaneously but oppositely shifted by a turn of said wheel.

Each valve-member consists of a tapered plug or gate 6 vertically movable between the ports 7 and 8, so that when it is lowered into engagement with both ports, the latter are thereby tightly closed; while its elevation opens said ports and permits the passage of fluids from the main supply pipe 1 to the branch pipe 2 or 3 controlled by such gate. Each plug or gate is internally threaded and receives the lower end of a screw 9 which is held against longitudinal displacement by a shoulder 10, whereby the rotation of such screw raises or lowers the gate as desired, it being kept from turning with said screw by means of splines 11 engaging corresponding splines on the inner surface of the valve chamber. To simultaneously but oppositely revolve said screws, a spindle 12 is located midway thereof and parallel therewith; its lower end being given a bearing in a boss 13 projecting from the main body of the valve, and its upper section being given a bearing in a cross bar 14, the latter being held by the outer parts of said screws. Fixed on this spindle is a spur gear 15 positioned a short distance below the hand wheel 5; and fixed on said screws 9 and meshing with said spur gear, are other spur gears 16. Said screws being one left-handed and the other right-handed, as shown in Fig. 1, the action of the gear 15 will be to turn the other gears in opposite directions, and consequently to screw one plug or gate 6 up and the other down, thereby simultaneously opening one and closing the other. As there is but one limit for the rotation of the hand wheel in either direction,—the limit given by the closure of a gate,—the same can be closed as tightly as needed.

To render the gears light and inexpensive, they are made quite thin, and provided with guard-disks 20 fixed to the outer faces of certain thereof, as shown in Fig. 1, which illustrates the gears 16 as the ones thus arranged, while the gear 15 enters between such disks into its mesh with the gears 16. This permits said gears to be quite thin, and yet in no danger of slipping laterally out of mesh with each other.

Fig. 3 sets forth substantially the same construction applied to a multi-way valve provided with several branch pipes 17; each of the latter having a gate, screw and spur gear 16 like those above described. The centrally located hand wheel has its gear 15 adapted to mesh with all said gears 16, and can thereby rotate all said screws simultaneously and raise or lower their associated gates. By having one or more of the screws right handed and the others left handed, one motion of the hand wheel will operate the valve-gates as desired.

What we claim as our invention and for which we desire Letters Patent is as follows, to wit:—

1. A body containing a plurality of valves, a hand-wheel, a toothed wheel connected with said hand wheel to rotate rigidly therewith, a toothed wheel for each of said valves meshing with the first named gear wheel, and a screw connected with each of the lastnamed gears to operate therewith and operate its associated valve; certain of said screws being of a right hand pitch and others of a left hand pitch, whereby the turning of said hand wheel will open certain of the valves and close the others.

2. A body containing two valve chambers each having a valve-gate therein, a right handed screw engaging one of said gates and a left handed screw engaging the other gate, both screws having stems projecting to the exterior of the valve-chambers, a spur gear fixed on the outer end of each of said stems, a spindle located midway between and parallel with said screws, a spur gear fixed on said spindle and meshing with the first-named gears, a hand-wheel fixed on said spindle, and a cross bar having its ends held by said screw-stems and having a bearing at its midlength for said spindle, said body being formed with a boss rotatably receiving the inner end of said spindle.

In testimony that we claim the foregoing invention, we have hereunto set our hands this 16th day of May, 1910.

FRANK A. MERRILL.
JOHN S. C. NICHOLLS.

Witnesses:
J. WATSON TAYLOR, Jr.,
S. B. UPHAM.